June 27, 1933.    F. L. LANE    1,915,323
MOUNTING FOR DIRECT MOTOR DRIVE SANDER DRUMS
Filed May 22, 1926    2 Sheets-Sheet 1
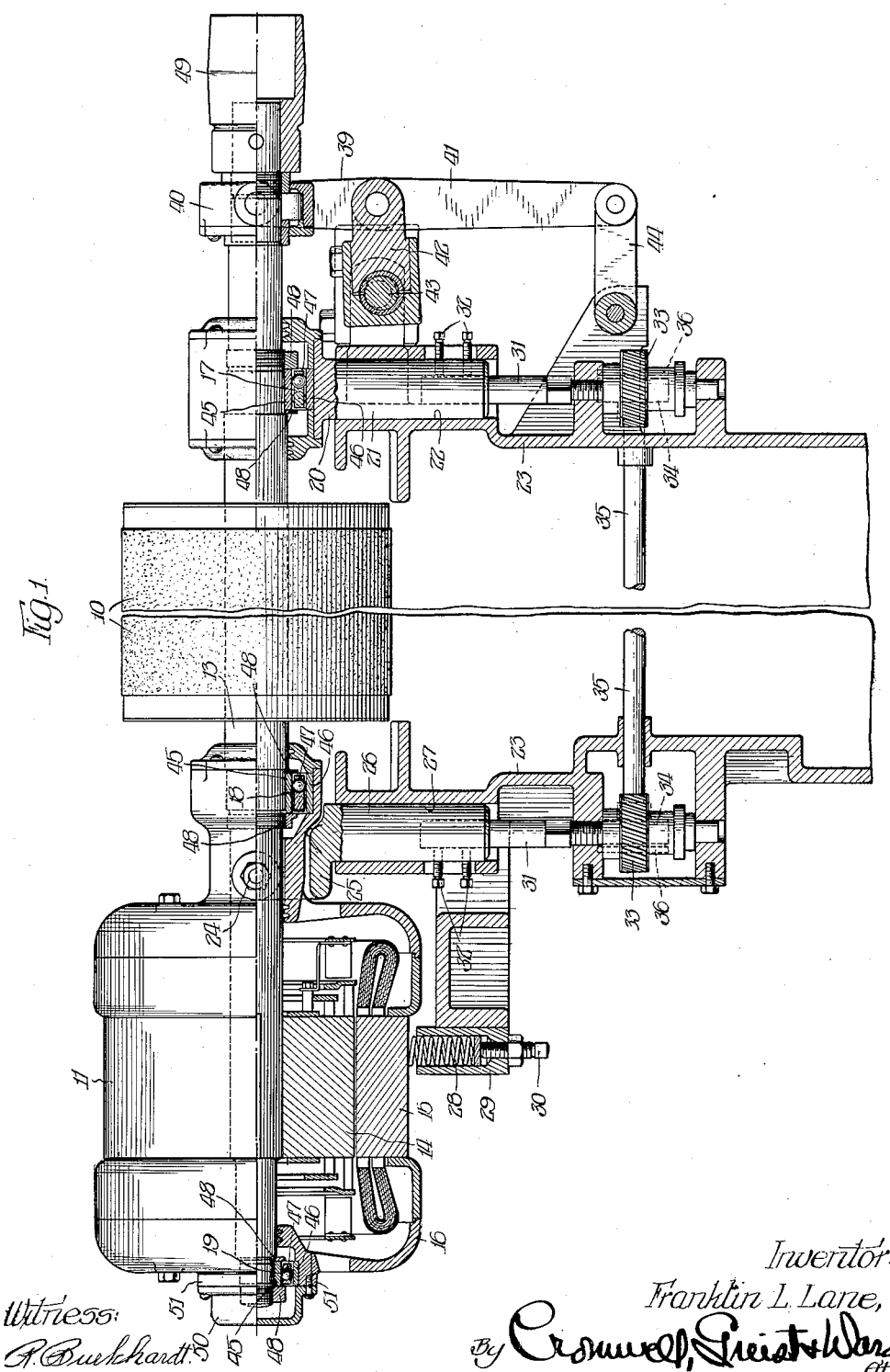
Inventor:
Franklin L. Lane, June 27, 1933. F. L. LANE 1,915,323
MOUNTING FOR DIRECT MOTOR DRIVE SANDER DRUMS
Filed May 22, 1926  2 Sheets-Sheet 2
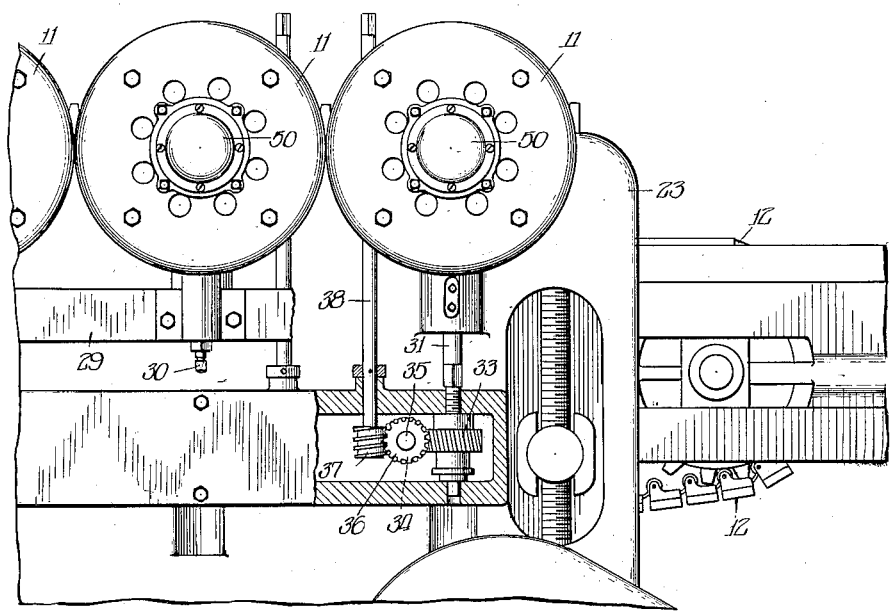
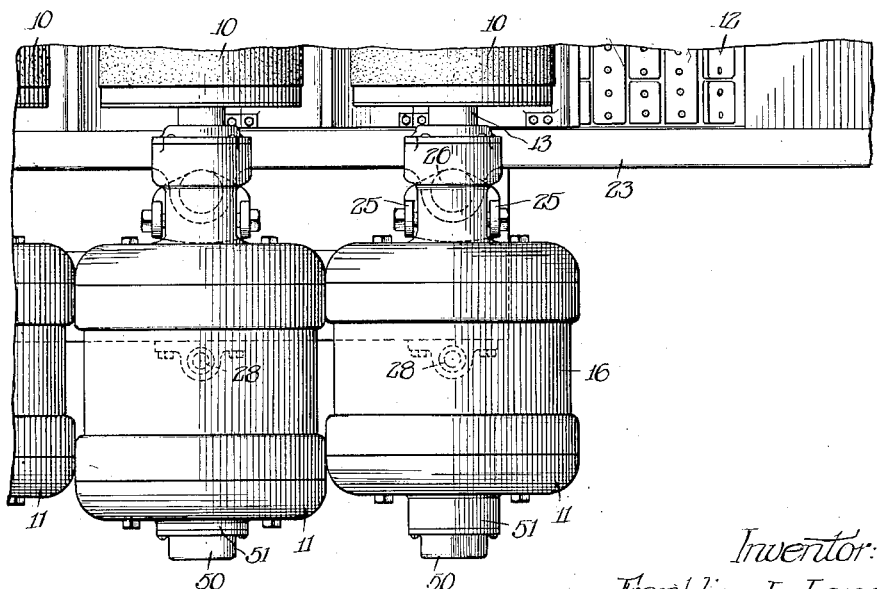
Witness:
R. Burkhardt
Inventor:
Franklin L. Lane,
By Cromwell, Greist & Warden
Attys Patented June 27, 1933

1,915,323

UNITED STATES PATENT OFFICE

FRANKLIN L. LANE, OF BELOIT, WISCONSIN, ASSIGNOR TO YATES-AMERICAN MACHINE COMPANY, OF BELOIT, WISCONSIN, A CORPORATION OF DELAWARE

MOUNTING FOR DIRECT MOTOR DRIVE SANDER DRUMS

Application filed May 22, 1926. Serial No. 110,372.

The present invention has to do with sanding machines, and is particularly concerned with the mounting of the drum and motor in those machines in which the motor is positioned at one end of the drum in direct driving relation to the same.

It has been the practice to mount the motor of a direct drive drum on a bracket at one side of the frame of the machine, but, with such an arrangement, difficulty is experienced in maintaining the motor in proper alignment with the drum, owing to the fact that vertical adjustments must be made in the position of the drum from time to time, and, unless the corresponding adjustments which must be made to the bracket for the motor are absolutely commensurate therewith, improper alignment is had, with consequent vibration, noise and rapid wear. Furthermore, even though the operator may be sufficiently skilled to bring the motor into proper alignment with the drum whenever an adjustment of the drum is found necessary, a considerable amount of time is required in which to make the change. Moreover, the drum is not always in parallelism with the top of the bracket for the motor, and, when it is not, the angular relationship existing between the axes of the drum and motor shafts must be compensated for as far as possible by the use of an interposed flexible coupling.

The primary object of the invention is to mount the motor and the drum in such a way that the motor will be maintained in proper alignment with the drum even though variations be made in the position of the latter.

Another important object is to provide a ball bearing support for the motor and the drum which will function efficiently as such during both rotary and endwise movement of the drum.

Other objects and advantages will be apparent upon a full understanding of the improved motor and drum mounting, the invention residing substantially in the construction, combination and arrangement of parts involved in the mounting.

In order that the invention may be readily understood, one form of the same is herein presented, but it will be understood that such form is selected merely for the purpose of exemplification and is not intended to restrict in any way the spirit of the invention short of its true and intended scope as defined in the appended claims.

In the drawings:

Fig. 1 is a partially sectioned side view of a motor and drum assembly which is mounted in a sanding machine in accordance with the invention;

Fig. 2 is an end view of the assembly; and

Fig. 3 is a top view of the same.

The sanding machine which is shown fragmentarily in the drawings is provided with a number of sander drums 10 which are rotated by individual electric motors 11 in positions over an endless bed 12. Each of the motor and drum assemblies are substantially the same, and only one therefore, need be described.

The drum 10 is mounted on a long shaft 13, and the motor 11 is mounted on one end of the same shaft, the motor armature 14 being fixedly secured to the shaft, and the motor field coils 15 being positioned within the motor frame 16 in radially opposed relation to the armature. The shaft 13 is journalled in three bearings, 17, 18 and 19. The bearing 17 is located at the opposite side of the drum from the motor in a bracket 20, and the bracket 20 has a downwardly extending shank 21 which is seated in a guide socket 22 formed in one of the two side-frames 23 of the machine. The bearings 18 and 19 are located in the ends of the motor frame 16, and the frame 16 is pivotally mounted at an intermediate point 24 in a bifurcated bracket 25, which bracket, like the bracket 20, has a downwardly extending shank 26 which is seated in a guide socket 27 formed in the other side-frame 23 of the machine. The bifurcated portion of the bracket 25 constitutes a yoke in which a reduced portion of the motor frame 16 is suspended on suitable trunnion pins. A coil spring 28 is interposed between the bottom of the motor frame 16 and an underlying projection 29 of the adjacent side-frame 23, and exerts an upward pressure on the motor frame, which pressure may be adjusted as to amount by turning a set screw 30 which supports the lower end of the spring in the projection. The purpose of the spring 28 is to equalize the load of the two bearings 18 and 19 in proportion to the size and arrangement of the same.

The motor and drum assembly may be adjusted vertically by means of two hoist screws 31 which are secured at their upper ends in sockets in the shanks of the brackets 20 and 25 by means of set screws 32. The hoist screws 31 are in threaded engagement at their lower ends with two worm gears 33 which are held against axial movement, and the worm gears 33 are in mesh with two worms 34 on a common cross-shaft 35. One of the worms 34 on the shaft 35 has fixedly associated therewith a worm gear 36 which is in mesh with a worm 37 on the lower end of an upright shaft 38, and, when any vertical adjustment of the motor and drum assembly is desired, the shaft 38 is turned in one direction or the other, causing the worms 34 on the shaft 35 to rotate the worm gears 33 and thus raise or lower the brackets 20 and 25 in unison.

The drum 10 is shifted axially during rotation—first in one direction and then in another—by means of an oscillating device 39 which is connected with the shaft 13 beyond the bearing 17. The device 39 includes a housing 40 through which the shaft 13 passes, a pair of spaced arms 41 which are connected to the housing by means of suitable trunnion pins, an eccentric follower 42 which is connected to the arms 41 below the housing 40 and cooperates with an eccentric shaft 43, and a link 44 which is carried by the adjacent side frame 23 and is connected to the arms 41 below the follower 42.

When the shaft 13 is oscillated, it shifts axially in the bearings 17, 18 and 19, and such bearings are so constructed as to afford frictionless ball bearing supports for the shaft under both rotary and axial movement thereof. Each of the bearings consists of an inner ring 45 which is secured to the shaft, an outer ring 46 which is carried in the associated bracket, and an interposed ball retainer 47 in which a number of balls are caged. There is, of course, sufficient clearance in the bearings to permit of a slight deflection of the shaft 13, particularly with respect to the bearing 17. If such were not the case, the angular position of the shaft with respect to the brackets supporting the bearing 17, could not be adjusted at all.

The ball retainers 47 are maintained between the rings 45 and 46 by means of end stops 48 which are secured to the shaft 13 at opposite sides of the inner rings 45, but the stops 48 are spaced apart a greater distance than the width of the retainers whereby to permit the latter to shift axially in either direction a distance which is approximately half of that which the shaft moves during oscillation, which spacing allows the balls in the retainers to roll freely with the shaft in a helical zigzagging path in conformity with the combined rotary and axial movement of the shaft.

The motors 11 which are used in connection with the drums 10 in the sanding machine are not always of the same size, owing to the fact that one of the shafts 13 in the machine is usually employed to drive a pulley 49 which operates some other part of the machine and therefore requires more power. It is advantageous, however, to have all of the shafts 13 of the same length whereby to permit the same to be interchanged in the machine, and the motor frames 16 are therefore provided, inwardly of the end-caps 50 thereof, with interchangeable adapter rings 51 of different lengths, in order that narrow rings may be used with wide motor frames, and vice versa, on shafts 13 of uniform length.

The herein described mounting for the motor and drum assembly is a distinctly new and improved adaptation of a direct motor drive and a ball bearing support to a sander drum. The single pivotally mounted support for both the motor and the motor end of the drum cooperates with the support at the other end of the drum to maintain perfect alignment of the motor with the drum regardless of whether or not the drum is in parallelism with the machine bed, and such alignment is not altered when changes are made in the position of the drum. It also serves to distribute the weight or load in proportion to the size of the supporting bearings.

While the invention is particularly applicable to sanders, it may be used equally well with other types of surface-treating machines, such as planers, matchers and the like, wherein the implement is driven directly by a motor and is disposed in spaced relation to the bed upon which the work is supported.

I claim:

1. In a surface-treating machine, a work-supporting bed, a shaft in spaced relation to the bed, an implement mounted on the shaft, a bearing for supporting one end of the shaft, a motor frame positioned about the other end of the shaft, two spaced bearings in the motor frame for supporting that end of the shaft, means pivotally connected with the motor frame intermediate the two bearings in the same but nearer one of such bearings for in turn supporting the motor frame, and a spring acting vertically against the motor frame between the pivotal support for the same and the other of such bearings.

2. In a surface-treating machine, a horizontal work-supporting bed, a horizontal shaft in spaced parallel relation to the bed, an implement mounted on the shaft, a bearing for supporting the weight of one end of the shaft, a motor frame positioned about the other end of the shaft, two spaced bearings in the motor frame for supporting the weight of that end of the shaft, and means for changing the load distribution between the two last mentioned bearings.

3. In a surface-treating machine, a substantially horizontal work-supporting bed, a rotary work-engaging implement in spaced generally parallel relation to the bed, a support for one end of the implement, an electric motor positioned at the other end of the implement in direct driving relation thereto, and a single support for both the motor and that end of the implement adjacent the same, said motor having a reduced neck portion at the end thereof adjacent the implement, and said last mentioned support consisting of a yoke which is positioned beneath said neck portion and is pivotally connected to the latter, and a compressed spring in engagement with the bottom of the motor at a point beyond the neck portion thereof.

4. In a sander, a frame, a shaft arranged crosswise of the frame, a sanding drum on the shaft, a motor armature on one end of the shaft in axially spaced relation to the drum, a motor casing about the armature, a motor field in the casing in concentric relation to the armature for rotating the shaft, means for reciprocating the shaft during rotation of the same, a vertically adjustable support at one side of the frame for the weight of that end of the shaft which is opposite the motor, a bearing interposed between said support and the shaft, a single vertically adjustable support at the other side of the frame for both the weight of the motor end of the shaft and the motor, two other bearings interposed between the casing and the shaft at opposite sides of the armature, means for automatically maintaining all of said bearings in alignment with each other when one of said vertically adjustable supports is raised or lowered relative to the other, and means for changing the load distribution between the two second-mentioned bearings.

In testimony whereof I have hereunto subscribed my name.

FRANKLIN L. LANE.